Figures 1, 2:
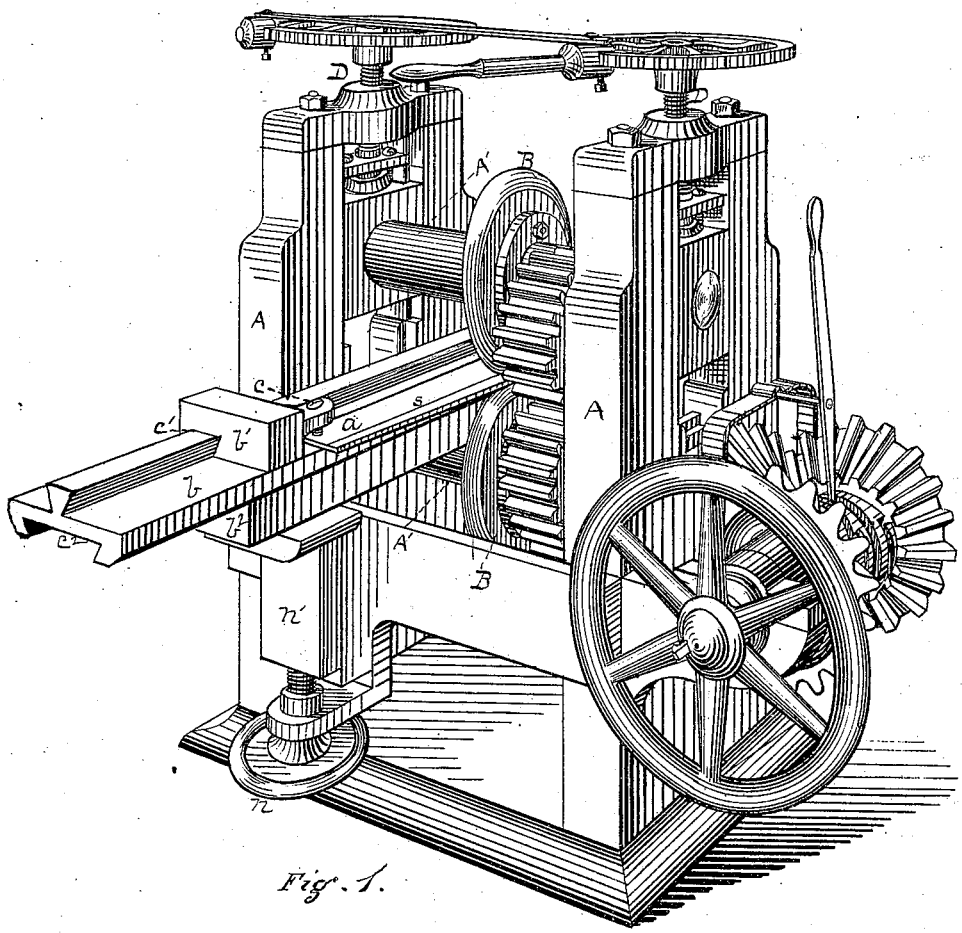

J. S. ATKINSON.
MODE OF DIVIDING COLD ROLLED IRON.

No. 193,842. Patented Aug. 7, 1877.

Witnesses
Y. C. Christy
C. L. Parker

Inventor: James S. Atkinson,
By Attorney George H. Christy

UNITED STATES PATENT OFFICE.

JAMES S. ATKINSON, OF PITTSBURG, ASSIGNOR TO BENJAMIN F. JONES, OF ALLEGHENY, PENNSYLVANIA.

IMPROVEMENT IN MODES OF DIVIDING COLD-ROLLED IRON.

Specification forming part of Letters Patent No. 193,842, dated August 7, 1877; application filed December 5, 1876.

*To all whom it may concern:*

Be it known that I, JAMES S. ATKINSON, of Pittsburg, county of Allegheny, and State of Pennsylvania, have invented or discovered a new and useful Improvement in Mode of Dividing Cold-Rolled Plates; and I do hereby declare the following to be a full, clear, concise, and exact description thereof, reference being had to the accompanying drawing, making a part of this specification, in which—like letters indicating like parts—

Figure 1 represents a perspective view of a machine suitable for carrying out or working the invention or discovery hereinafter described and claimed; and Fig. 2 is an enlarged transverse section of a "cold-rolled" bar or plate, illustrative of the effect produced.

My improvement relates to a mode of dividing cold-rolled metallic bars and plates by the application to its opposite faces, and along the desired line of separation, of bevel-edged disks, which, acting under sufficient pressure, shall score or groove such faces along such line of separation, with a resultant rupture of the body of the bar or plate along the same line or in the plane thereof.

Cold-rolled metallic bars and plates, and the mode of making them, are well known, and need not here be described. In making and working such material I have discovered that it possesses the previously unknown property or characteristic of being divided, not only by shearing or cutting, as such operations have heretofore been employed in working malleable metals, but also by the application of pressure through the use of bevel-edged disks, whereby, after a comparatively shallow groove is made in each face, the body of the bar or plate separates in the line or plane in which such pressure is applied.

In order to carry out this mode of operation, I have devised a machine suitable for the purpose, the salient features of which are shown in Fig. 1.

The plate $a$ represents a plate of cold-rolled iron. It is properly adjusted on the reciprocating feed-table $b$ by the use of suitable clamping-blocks $b^1$ by the use of suitable clamping-blocks $b^1$ and set-screws $c$, (these devices, as shown, being duplicated at the opposite end of the feed-table.) The clamping-blocks $b^1$ are, by a tongue and groove, $c^1$, and set-screw or other like device, made adjustable on the table, so as to be used with bars or plates of different lengths. The table $b$ reciprocates on the support $b^2$, and is guided thereon by tongue and groove, the latter being shown at $c^2$. Either end of the table may be raised or lowered by an adjusting-screw, $n$, which engages a vertically-moving standard, $n'$, or by other suitable means. In any suitable housing or frame, A, I mount the shafts A', and provide the same with the usual or any known or desired arrangement of bearing-blocks, pressure-screws, &c. On these shafts I secure the bevel-edged disks B B, with their edges in the same plane, and in such position that the plate $a$, projecting beyond or over the edge of its table, may be caused to pass between the beveled edges of such disks, the direction of the feed being lengthwise of the bar or at a slight angle thereto. These parts are so arranged and adjusted that, as the bar or plate $a$ is caused to move forward or back between the disks, the edges of the disks will engage the opposite faces of the bar or plate, and, by the application of pressure through the adjusting and pressure screws D, will make a shallow groove in each face, the line of such groove being indicated by the line $s$. One or more passes are given to the bar $a$, according to the pleasure of the workman, or the strength of the machine, or the amount of driving-power available for the purpose. Suitable gearing for driving the machine is shown in the drawing; but, being such as is well known for effecting similar motions in mechanical operations, it need not be described. Preferably a very light groove or mere score is made at the first pass, and the same is deepened at one or more subsequent passes. This operation, instead of going on until the disks have cut through or almost entirely through the plate or bar, (as has heretofore been considered necessary in cutting metallic malleable bars,) is arrested or stopped by the severance or separation or rupture of the body of the bar, while only a comparatively shallow groove has been cut in each face.

In practical operation I have found that with a cold-rolled iron bar or plate five-eighths of an inch thick a groove thus cut in each face of from one-sixteenth to one-eighth of an inch deep will result in the effect named, the separation of the remaining three or four eighths being apparently a break or split. This effect is illustrated in Fig. 2, where $a\ a$ represent the plate, $s\ s$ the grooves, and $s'$ the intermediate break which follows the cutting of the grooves. These relative dimensions may vary somewhat in different cold-rolled metals, or in different qualities of the same metal after being more or less cold-rolled, the general rule being that the more thoroughly the material is cold-rolled the less depth of cut relative to the entire thickness will be required to effect the separation or rupture of the body.

In working my present improvement, I do not limit myself to the machine shown and described, as the same method of operation, on the same material, to secure the same substantial result, may be employed on machines differing in many respects from the one shown and described. Nor do I make any claim herein to the mechanical devices employed as such, since they are included in, and form the subject-matter of, a separate application already filed.

My improvement may also be worked in a somewhat modified form by the use of a single revolving disk, working on the bar or plate in the desired line of separation, the plate or bar being supported on the opposite side, and, after a shallow groove has been made in one face, inverting the bar and making a like groove in the opposite face in the same plane; but the use of two disks is preferable.

This improvement is chiefly designed for dividing cold-rolled metallic plates into finger-bars by an oblique division from end to end of the plate, as more particularly described in a separate application already filed; but at the same time it may be employed for other purposes. Its chief utility results from the saving in material as compared with shearing, and the saving in time and expense as compared with cutting, along with greater ease, accuracy, and facility in doing the work.

I claim herein—

The method of separating or dividing cold-rolled metallic plates and bars by cutting under pressure a comparatively shallow groove, $s$, in each face, and as a result of such cutting, rupturing, as at $s'$, the body of the plate or bar intermediate between the bottoms of the grooves, substantially in the manner set forth.

In testimony whereof I have hereunto set my hand.

JAMES S. ATKINSON.

Witnesses:
G. M. LAUGHLIN,
J. J. McCORMICK.